United States Patent
Yoshimura

(10) Patent No.: US 9,210,601 B2
(45) Date of Patent: Dec. 8, 2015

(54) MOBILE STATION, COMMUNICATION CONTROL METHOD, AND COMMUNICATION CONTROL SYSTEM

(71) Applicant: FUJITSU LIMITED, Kawasaki-shi, Kanagawa (JP)

(72) Inventor: Masahiro Yoshimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 13/910,747

(22) Filed: Jun. 5, 2013

(65) Prior Publication Data
US 2014/0010106 A1    Jan. 9, 2014

(30) Foreign Application Priority Data
Jul. 6, 2012    (JP) .................................. 2012-152952

(51) Int. Cl.
*H04W 4/00*    (2009.01)
*H04W 24/08*    (2009.01)
*H04W 36/22*    (2009.01)

(52) U.S. Cl.
CPC .............. *H04W 24/08* (2013.01); *H04W 36/22* (2013.01)

(58) Field of Classification Search
USPC ........................... 370/328–339; 455/436–444
See application file for complete search history.

(56) References Cited

U.S. PATENT DOCUMENTS

| | | | |
|---|---|---|---|
| 2008/0095120 A1 | 4/2008 | Hong et al. | |
| 2009/0163223 A1* | 6/2009 | Casey | ........................... 455/453 |

FOREIGN PATENT DOCUMENTS

| | | |
|---|---|---|
| JP | 2003-9209 | 1/2003 |
| JP | 2008-72291 | 3/2008 |
| JP | 2008-104190 | 5/2008 |
| JP | 2008-288627 | 11/2008 |

* cited by examiner

*Primary Examiner* — Frank Duong
(74) *Attorney, Agent, or Firm* — Myers Wolin, LLC

(57) ABSTRACT

A mobile station includes: a processor coupled to a memory, configured to: measure an amount of traffic in a serving cell, determine a condition for transferring to another cell based on the measured amount of traffic, measure a received signal power of the serving cell and the another cell, and control transfer from the serving cell to the another cell when the measured received signal power satisfies the determined condition.

13 Claims, 10 Drawing Sheets

FIG. 2

| USER LEVEL | BAND IN USE DURING COMMUNICATION | EXAMPLE OF SETTING CELL DETECTION PARAMETER |
|---|---|---|
| L1 | ~1Mbps | PERFORM NO MEASUREMENT FOR CELL C2 |
| L2 | 1~5Mbps | REPORT MEASUREMENT RESULT OF RECEIVED SIGNAL POWER TO NETWORK WHEN RECEIVED SIGNAL POWER OF CELL C2 EXCEEDS THRESHOLD VALUE $T_2$ AND RECEIVED SIGNAL POWER OF CELL C1 FALLS BELOW THRESHOLD VALUE $T_1$ |
| L3 | 5~10Mbps | REPORT MEASUREMENT RESULT OF RECEIVED SIGNAL POWER TO NETWORK WHEN RECEIVED SIGNAL POWER OF CELL C2 EXCEEDS THRESHOLD VALUE $T_3$ |
| L4 | 10Mbps~ | MEASURE RECEIVED SIGNAL POWER IN ANOTHER COMMUNICATION SYSTEM, AND SWITCH COMMUNICATION SYSTEM WHEN MEASURED RECEIVED SIGNAL POWER EXCEEDS THRESHOLD VALUE $T_4$ |

| USER LEVEL | BAND IN USE DURING COMMUNICATION | EXAMPLE OF SETTING CELL DETECTION PARAMETER |
|---|---|---|
| L1 | ~1Mbps | REPORT MEASUREMENT RESULT OF RECEIVED SIGNAL POWER TO NETWORK WHEN RECEIVED SIGNAL POWER OF CELL C1 EXCEEDS THRESHOLD VALUE $T_5$ |
| L2 | 1~5Mbps | REPORT MEASUREMENT RESULT OF RECEIVED SIGNAL POWER TO NETWORK WHEN RECEIVED SIGNAL POWER OF CELL C1 EXCEEDS THRESHOLD VALUE $T_6$ AND RECEIVED SIGNAL POWER OF CELL C2 FALLS BELOW THRESHOLD VALUE $T_7$ |
| L3 | 5~10Mbps | REPORT MEASUREMENT RESULT OF RECEIVED SIGNAL POWER TO NETWORK WHEN RADIO WAVE RECEIVED SIGNAL POWER OF CELL C2 FALLS BELOW THRESHOLD VALUE $T_8$ (PERFORM NO MEASUREMENT FOR CELL C1) |
| L4 | 10Mbps~ | MEASURE RECEIVED SIGNAL POWER IN ANOTHER COMMUNICATION SYSTEM, AND SWITCH COMMUNICATION SYSTEM WHEN MEASURED RECEIVED SIGNAL POWER EXCEEDS THRESHOLD VALUE $T_9$ |

FIG. 8

| USER LEVEL | RECORD OF USE ON STANDBY | EXAMPLE OF SETTING CELL DETECTION PARAMETER |
|---|---|---|
| L1 | ~1Mbps | PROHIBIT STANDBY IN CELL C2 |
| L2 | 1~5Mbps | PERFORM CELL RESELECTION TO CELL C2 WHEN RECEIVED SIGNAL POWER OF CELL C2 EXCEEDS THRESHOLD VALUE $T_{11}$ AND RECEIVED SIGNAL POWER OF CELL C1 FALLS BELOW THRESHOLD VALUE $T_{10}$ |
| L3 | 5~10Mbps | PERFORM CELL RESELECTION TO CELL C2 WHEN RECEIVED SIGNAL POWER OF CELL C2 EXCEEDS THRESHOLD VALUE $T_{12}$ |
| L4 | 10Mbps~ | MEASURE RECEIVED SIGNAL POWER IN ANOTHER COMMUNICATION SYSTEM, AND SWITCH COMMUNICATION SYSTEM WHEN MEASURED RECEIVED SIGNAL POWER EXCEEDS THRESHOLD VALUE $T_{13}$ |

| USER LEVEL | RECORD OF USE ON STANDBY | EXAMPLE OF SETTING CELL DETECTION PARAMETER |
|---|---|---|
| L1 | ~1Mbps | PERFORM CELL RESELECTION TO CELL C1 WHEN RECEIVED SIGNAL POWER OF CELL C2 EXCEEDS THRESHOLD VALUE $T_{14}$ |
| L2 | 1~5Mbps | PERFORM CELL RESELECTION TO CELL C1 WHEN RECEIVED SIGNAL POWER OF CELL C1 EXCEEDS THRESHOLD VALUE $T_{15}$ AND RECEIVED SIGNAL POWER OF CELL C2 FALLS BELOW THRESHOLD VALUE $T_{16}$ |
| L3 | 5~10Mbps | PERFORM CELL RESELECTION TO CELL C1 WHEN RECEIVED SIGNAL POWER OF CELL C1 EXCEEDS THRESHOLD VALUE $T_{17}$ AND RECEIVED SIGNAL POWER OF CELL C2 FALLS BELOW THRESHOLD VALUE $T_{18}$ |
| L4 | 10Mbps~ | MEASURE RECEIVED SIGNAL POWER IN ANOTHER COMMUNICATION SYSTEM, AND SWITCH COMMUNICATION SYSTEM WHEN MEASURED RECEIVED SIGNAL POWER EXCEEDS THRESHOLD VALUE $T_{19}$ |

144

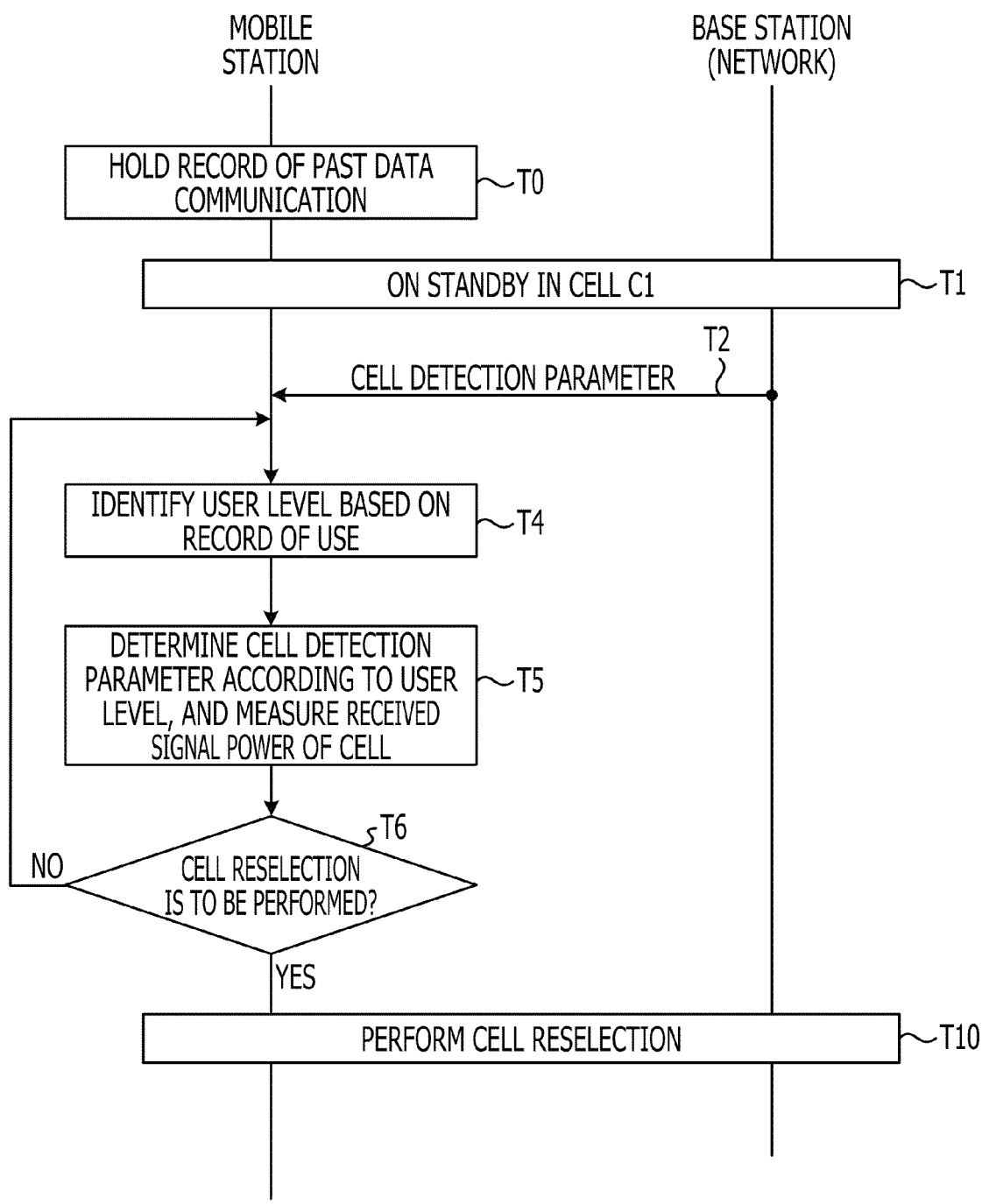

MOBILE STATION, COMMUNICATION CONTROL METHOD, AND COMMUNICATION CONTROL SYSTEM

CROSS-REFERENCE TO RELATED APPLICATION

This application is based upon and claims the benefit of priority of the prior Japanese Patent Application No. 2012-152952, filed on Jul. 6, 2012, the entire contents of which are incorporated herein by reference.

FIELD

The embodiments discussed herein are related to a mobile station, a communication control method, and a communication control system.

BACKGROUND

Various technologies are known which avoid congestion of a network due to an increase of the amount of traffic in a radio communication system. For example, when a network (for example, a base station) monitors the amount of traffic of a mobile station during communication and detects an amount of traffic exceeding a given value, the network changes the communication band (channel) currently used by the mobile station, or restricts the call from the mobile station. Optionally, a mobile station during communication in a cell compares the results of measurement of the received signal power from neighbor base stations with a threshold value indicated from the network. And when the received signal power from a neighbor cell of a base station exceeds the threshold value, handover to the cell of the neighbor base station is performed according to a control message from the network. A mobile station on standby in a cell compares the results of measurement of the received signal power from neighbor cells of base stations with a threshold value included in information for notice sent from the network. When the received signal power from a neighbor base station exceeds the threshold value, a cell for standby is changed (cell reselection) from the serving cell to the cell of the neighbor base station.

The following are reference documents: Japanese Laid-Open Patent Publication No. 2003-9209, Japanese Laid-Open Patent Publication No. 2008-288627, Japanese Laid-Open Patent Publication No. 2008-104190, and Japanese Laid-Open Patent Publication No. 2008-72291.

SUMMARY

According to an aspect of the invention, a mobile station includes: a processor coupled to a memory, configured to: measure an amount of traffic in a serving cell, determine a condition for transferring to another cell based on the measured amount of traffic, measure a received signal power of the serving cell and the another cell, and control transfer from the serving cell to the another cell when the measured received signal power satisfies the determined condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an example of setting a cell detection parameter depending on a band in use during communication in a cell C1 according to Embodiment 1;

FIG. 3 is a table illustrating an example of setting a cell detection parameter depending on a band in use during communication in a cell C2 according to Embodiment 1;

FIG. 8 is a table illustrating an example of setting a cell detection parameter depending on record of use on standby in cell C1 according to Embodiment 2;

FIG. 9 is a table illustrating an example of setting a cell detection parameter depending on record of use on standby in cell C2 according to Embodiment 2; and FIG. 10 is a sequence diagram for explaining the operation of a communication control system according to Embodiment 2.

DESCRIPTION OF EMBODIMENTS

Hereinafter, embodiments of a mobile station, a communication control method, and a communication control system which are disclosed in the present application will be described in detail with reference to the accompanying drawings. It is to be noted that the mobile station, the communication control method for controlling communication, and the communication control system disclosed in the present application are not limited to the following embodiments.

While inventing the present embodiments, observations were made regarding related arts. Such observations include the following, for example.

Each of the related arts described above has a problem in that the processing load of a network is high because the network primarily serves to control mobile stations. Particularly when a great number of mobile stations are connected to a network or processing load is concentrated on a network, an increase in the network load is significant. With the related arts described above, it is possible for a mobile station to measure the amount of traffic and to report the measurement results to the network according to a control message from the network. However, it is difficult to reduce the amount of processing performed by the network and reduce the load because processing after the report is performed according to a control message from the network, and thus the load to the network is not distributed by the related arts. For example, after the measurement results are reported to the network, the operation of a mobile station is performed by control message from the network irrespective of the amount of traffic, and thus it is not possible for the mobile station itself to determine a target cell for handover according to the amount of traffic.

The technology disclosed herein has been devised in view of the above-described circumstances, and the present disclosure provides a mobile station, a communication control method, and a communication control system which may efficiently distribute the traffic in a cell while reducing the network load.

[Embodiment 1]

Figure 1:
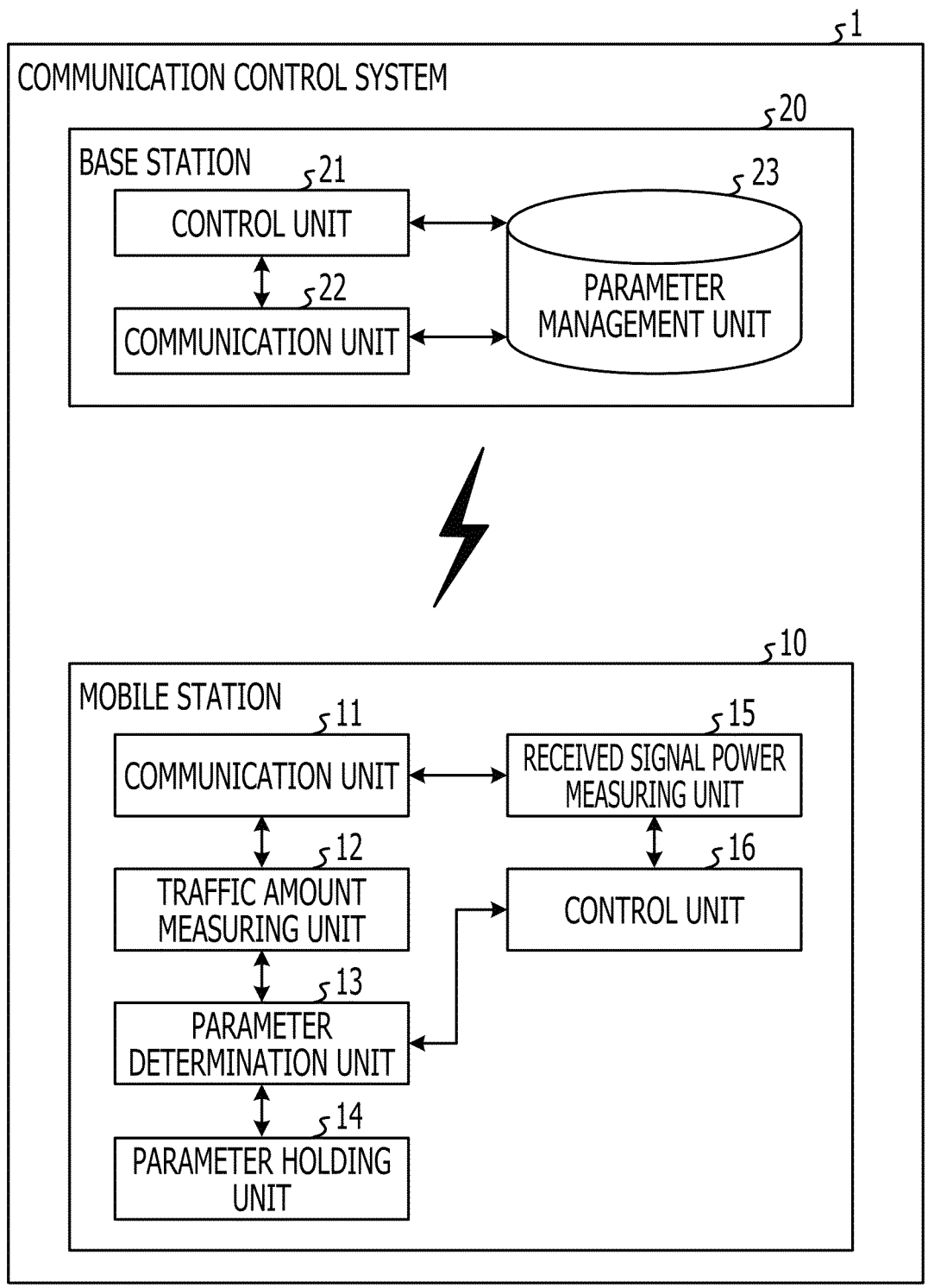
FIG. 1 is a diagram illustrating the functional configuration of a communication control system.

Hereinafter, the configuration of a communication control system according to Embodiment 1 disclosed in the present application will be described. FIG. 1 is a diagram illustrating the functional configuration of a communication control system 1. As illustrated in FIG. 1, the communication control system 1 has a mobile station 10 and a base station 20. The mobile station 10 is a wireless communication terminal compatible with a plurality of different wireless communication systems (for example, 3G (Third Generation), Long Term Evolution (LTE), and wireless Local Area Network (WLAN)). The mobile station 10 includes a communication unit 11, a traffic amount measuring unit 12, a parameter determination unit 13, a parameter holding unit 14, a received signal power measuring unit 15, and a control unit 16. These components are connected to each other such that signals and data may be inputted/outputted unidirectionally or bidirectionally.

The communication unit 11 receives a cell detection parameter of the base station 20 when the mobile station 10 enters the cell of the base station 20. The traffic amount measuring unit 12 measures the amount of traffic in the serving cell of the base station 20. The amount of traffic is, for example, the amount of packets (measured in terms of bits per second) which are transmitted and received between the mobile station 10 and the base stations 20 per unit of time, but is not necessarily an amount per second and may be an average value over a past time period (for example, 1 minute to 1 hour). Information of the unit for the amount of packets may be indicated from the base station 20 to the mobile station 10 as one of the cell detection parameters. The parameter determination unit 13 refers to the below-described parameter holding unit 14, and determines a cell detection parameter for which conditions for transferring to a cell are set, based on the amount of traffic measured by the traffic amount measuring unit 12.

The parameter holding unit 14 holds a cell detection parameter for each user level as a condition for determining whether or not the mobile station 10 performs handover. FIG. 2 is a table illustrating an example of setting a cell detection parameter depending on a band in use during communication in cell C1 according to Embodiment 1. Here, cell C1 is a serving cell before the mobile station 10 is handed over. As illustrated in FIG. 2, "band in use during communication", which indicates the current amount of traffic, is set in a cell detection parameter 141 according to four user levels L1 to L4. In addition, a cell detection parameter is set for each band in use during communication in such a manner that handover from the current cell C1 to another cell C2 is more likely to occur as the amount of traffic increases.

Specifically, when the band in use during communication is "less than 1 Mbps", the cell detection parameter is set as "no measurement is performed for cell C2", and thus the mobile station 10 does not perform handover. When the band in use during communication is "1 Mbps or higher and lower than 5 Mbps", the mobile station 10 "reports measurement results of received signal power to the network in the case where the received signal power of cell C2 exceeds a threshold value $T_2$ and the received signal power of cell C1 falls below a threshold value $T_1$." On the network side which has received the report, the base station 20 sends the control message to the mobile station 10 to perform handover to cell C2 in response to receiving the measurement results. The threshold value $T_2$ is, for example, −100 dBm and the threshold value $T_1$ is, for example, −120 dBm. In this manner, when the band in use during communication is "1 Mbps or higher and lower than 5 Mbps", a condition is set as the cell detection parameter in which handover is less likely to occur.

On the other hand, when the band in use during communication is "5 Mbps or higher and lower than 10 Mbps", the mobile station 10 "reports measurement results of received signal power to the network in the case where the received signal power of cell C2 exceeds a threshold value $T_3$. "On the network side which has received the report, the base station 20 sends the control message to the mobile station 10 to perform handover to cell C2 in response to receiving the measurement results. The threshold value $T_3$ is, for example, −120 dBm. In this manner, when the band in use during communication is "5 Mbps or higher and lower than 10 Mbps", a condition is set as the cell detection parameter in which handover is likely to occur. In addition, when the band in use during communication is "10 Mbps or higher", the mobile station 10 "measures the received signal power of a cell C3 in another communication system, with sufficient remaining capacity and switches to the communication system in the case where the measured signal power exceeds a threshold value $T_4$." The threshold value $T_4$ is, for example, −120 dBm. In this manner, when the band in use during communication is "10 Mbps or higher", the mobile station 10 utilizes another wireless communication system (for example, WLAN) because the amount of traffic is significantly high.

The example of setting the cell detection parameter illustrated in FIG. 2 is preferable when the communication control system 1 intends to keep those users with a low band within cell C1 as much as possible out of the users during communication in cell C1 and to transfer those users with a high band to cell C2 or another communication system as much as possible. For example, such an example of setting is used when cell C1 has a large communication area (coverage) and less available band capacity, and another cell (cell C2) with more available band capacity is present in the area of cell C1. Furthermore, for example, when cell C2 is overloaded due to a variation in network load or change of cell arrangement, the aforementioned example of setting may be changed as appropriate to make it difficult for handover to cell C2 to occur (make it easy for users to stay in cell C1).

FIG. 3 is a table illustrating an example of setting a cell detection parameter depending on a band in use during communication in cell C2 according to Embodiment 1. Here, cell C2 is a target cell after handover of the mobile station 10. As illustrated in FIG. 3, the cell detection parameter 142 has a similar configuration to that of FIG. 2, however, in contrast to the cell detection parameter 141, a cell detection parameter is set for each band in use during communication in such a manner that handover from the current cell C2 to another cell C1 is less likely to occur as the amount of traffic increases.

Specifically, when the band in use during communication is "lower than 1 Mbps", the mobile station 10 "reports measurement results of received signal power to the network in the case where the received signal power of cell C1 exceeds a threshold value $T_5$." On the network side which has been received the report, the base station 20 sends the control message to the mobile station 10 to perform handover to cell C1 in response to receiving the measurement results. The threshold value $T_5$ is, for example, −120 dBm. In this manner, when the band in use during communication is "lower than 1 Mbps", a condition is set as the cell detection parameter in which handover is likely to occur. When the band in use during communication is "1 Mbps or higher and lower than 5 Mbps", the mobile station 10 "reports measurement results of received signal power to the network in the case where the received signal power of cell C1 exceeds a threshold value $T_6$ and the received signal power of cell C2 falls below a threshold value $T_7$." On the network side which has received the report, the base station 20 sends the control message to the mobile station 10 to perform handover to cell C1 in response to receiving the measurement results. The threshold value $T_6$ is, for example, −120 dBm and the threshold value $T_7$ is, for example, −100 dBm. In this manner, when the band in use during communication is "1 Mbps or higher and lower than 5 Mbps", a condition is set as the cell detection parameter in which handover is less likely to occur than in the user level L1.

When the band in use during communication is "5 Mbps or higher and lower than 10 Mbps", the mobile station 10 "reports measurement results of received signal power to the network in the case where the received signal power of cell C2 falls below a threshold value $T_8$." In the above process, the mobile station 10 does not measure the received signal power of cell C1, and thus the base station 20 sends the control message to the mobile station 10 to perform blind handover to cell C1 in response to receiving the measurement results. The threshold value $T_8$ is, for example, −120 dBm. In this manner, when the band in use during communication is "5 Mbps or higher and lower than 10 Mbps", a condition is set as the cell detection parameter in which handover is less likely to occur than in the user level L2. In addition, when the band in use during communication is "10 Mbps or higher", the mobile station 10 "measures the received signal power of cell C3 in another communication system, with sufficient remaining capacity and switches to the communication system in the case where the measured signal power exceeds a threshold value $T_9$." The threshold value $T_9$ is, for example, −120 dBm. In this manner, when the band in use during communication is "10 Mbps or higher", the mobile station 10 preferably tries another wireless communication system (for example, WLAN) because the amount of traffic is significantly high.

The example of setting the cell detection parameter illustrated in FIG. 3 is preferable when the communication control system 1 intends to keep those users with a high band within cell C2 out of the users during communication in cell C2 or to transfer those users with a high band to another communication system as much as possible, and to transfer those users with a low band to cell C1 as much as possible. Such an example of setting may be changed as appropriate to make it easy for handover to cell C1 to occur (make it difficult for users to stay in cell C2), for example, when cell C2 is overloaded due to a variation in network load or change of cell arrangement.

The received signal power measuring unit 15 measures the received signal power in the serving cell of the mobile station 10 and in neighbor cells. The received signal power is, for example, a Received Signal Strength Indication (RSSI), however, a Channel State Information (CSI) value such as a Channel Quality Indicator (CQI) which indicates a receiving level, or a Signal to Interference Ratio (SIR) value or a Signal-to-Interference plus Noise power Ratio (SINR) value which each indicate a radio wave state may be used instead of the received signal power. When the received signal power measured by the received signal power measuring unit 15 satisfies the condition which is determined by the parameter determination unit 13, the control unit 16 controls transfer of the mobile station 10 from the serving cell to one of the aforementioned neighbor cells.

Referring back to FIG. 1, the base station 20 has a control unit 21, a communication unit 22, and a parameter management unit 23. These components are connected to each other such that signals and data may be inputted/outputted unidirectionally or bidirectionally. Upon detecting reception of measurement results of received signal power, the control unit 21 controls handover of the mobile station 10 from the serving cell to the neighbor cell. The communication unit 22 receives the measurement results of received signal power from the mobile station 10, and in response to the reception, transmits a control message of handover to the mobile station 10. The parameter management unit 23 generates and holds the above-described cell detection parameters, and sends the control message to the communication unit 22 to transmit the cell detection parameter to the mobile station 10 upon entry of the mobile station 10 in the cell of the base station 20. The cell detection parameter is data which is held per cell by a plurality of base stations including the base station 20, and may be set or changed as appropriate according to a communication load, arrangement, a size, and a communication state of each cell on the network side.

Figure 4:
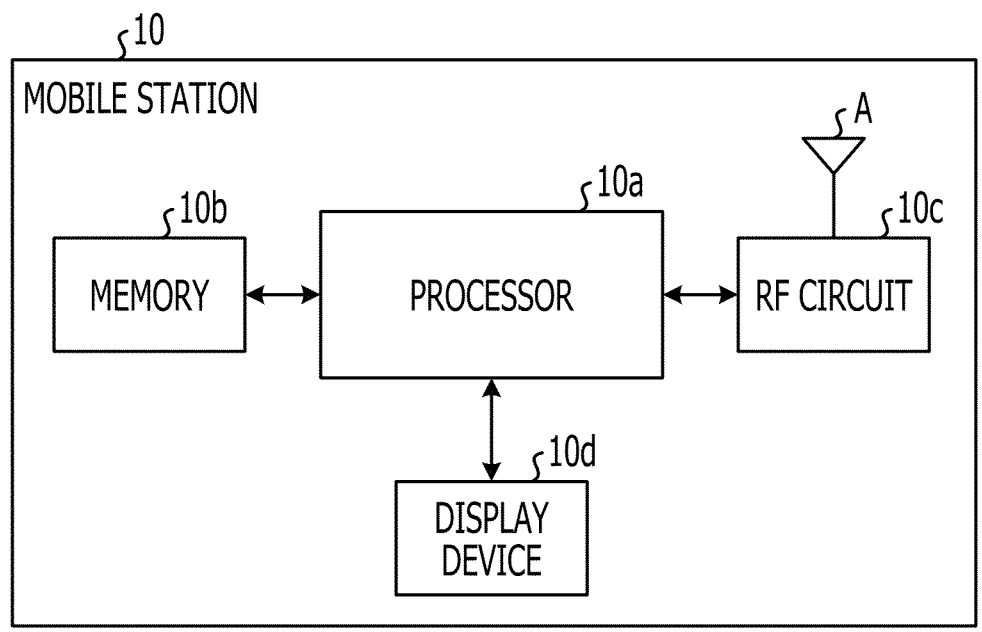
FIG. 4 is a diagram illustrating the hardware configuration of a mobile station.

FIG. 4 is a diagram illustrating the hardware configuration of the mobile station 10. As illustrated in FIG. 4, the mobile station 10 includes a processor 10a, a memory 10b, a Radio Frequency (RF) circuit 10c, and a display device 10d such as a Liquid Crystal Display (LCD) as hardware. The RF circuit 10c has an antenna A. The communication unit 11 of the mobile station 10 is achieved, for example, by the RF circuit 10c. The traffic amount measuring unit 12, the parameter determination unit 13, the received signal power measuring unit 15, and the control unit 16 are achieved by the processor 10a such as a Central Processing Unit (CPU) or a Digital Signal Processor (DSP), for example. The parameter holding unit 14 is achieved by the memory 10b such as a Random Access Memory (RAM), a Read Only Memory (ROM), or a flash memory, for example.

The configuration of the mobile station 10 has been mainly described so far, and the configuration of other mobile stations 30, 40, and 50 is the same as the configuration of the mobile station 10. Thus, common components are labeled with reference symbols with the same last numeral, and the figures and detailed description are omitted. Similarly, the configuration of the base station 20 has been mainly described, and the configuration of other base stations 60, 70 is the same as the configuration of the base station 20. Thus, common components are labeled with reference symbols with the same last numeral, and the figures and detailed description are omitted.

Next, the operation of the communication control system 1 according to Embodiment 1 will be described with reference to FIGS. 5 to 7. The assumption in the description of the operation is that the base station 20 forming cell C1 adopts 3G wireless communication system, and the base station 60 forming cell C2 adopts LTE wireless communication system which has a larger capacity and a higher communication speed than 3G wireless communication system. In addition, the base station 70 is an access point of WLAN, and forms a cell C3 in the neighbor cell of the base station 70, the cell C3 having a narrow band and allowing a high-speed and large-capacity communication.

Figure 5:
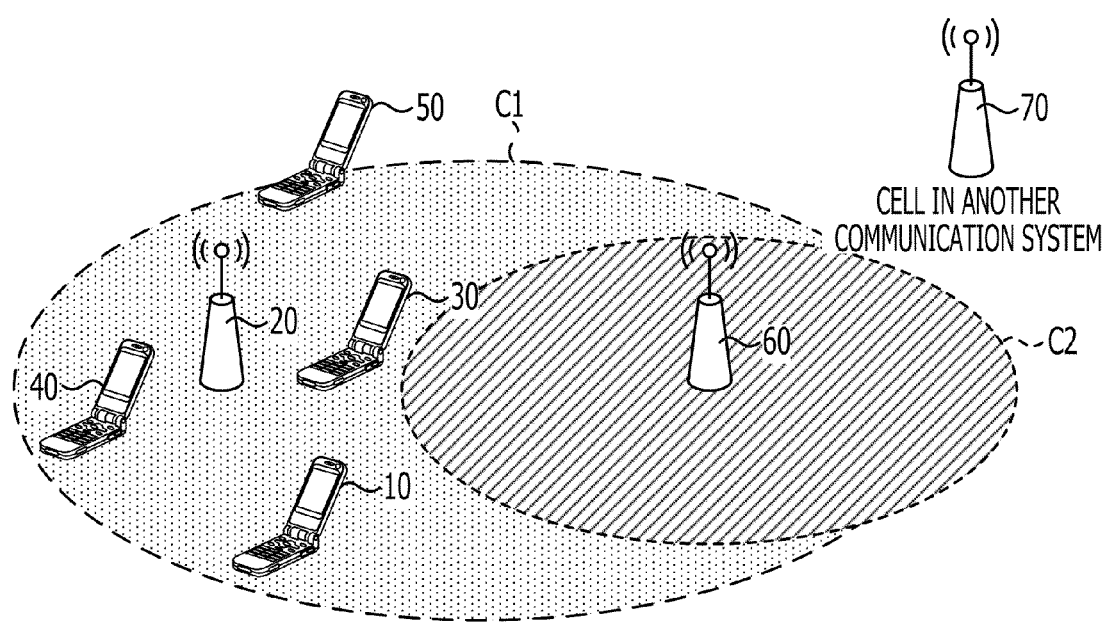
FIG. 5 is an illustration for explaining the manner in which the cell detection parameter is variably controlled when each mobile station is associated with cell C1.

FIG. 5 is an illustration for explaining the manner in which the cell detection parameter is variably controlled when the mobile stations 10, 30, 40, and 50 are associated with cell C1. In the present embodiment, as illustrated in FIG. 5, it is assumed that the mobile stations 10, 30, 40, and 50 belong to cell C1 (dotted area), and communication is performed (S1 in FIG. 6) between each mobile station and the 3G base station 20 using the traffic bands of 1 Mbps or lower, 1 to 5 Mbps, 5 to 10 Mbps, and 10 Mbps or higher. For each of the mobile stations 10, 30, 40, and 50, handover may be performed from cell C1 to cell C2 with each mobile station associated with cell C1 because cell C2 (shaded area), which has a large capacity and a communication area narrower than cell C1, is arranged so as to be overlapped with cell C1.

Figure 6:
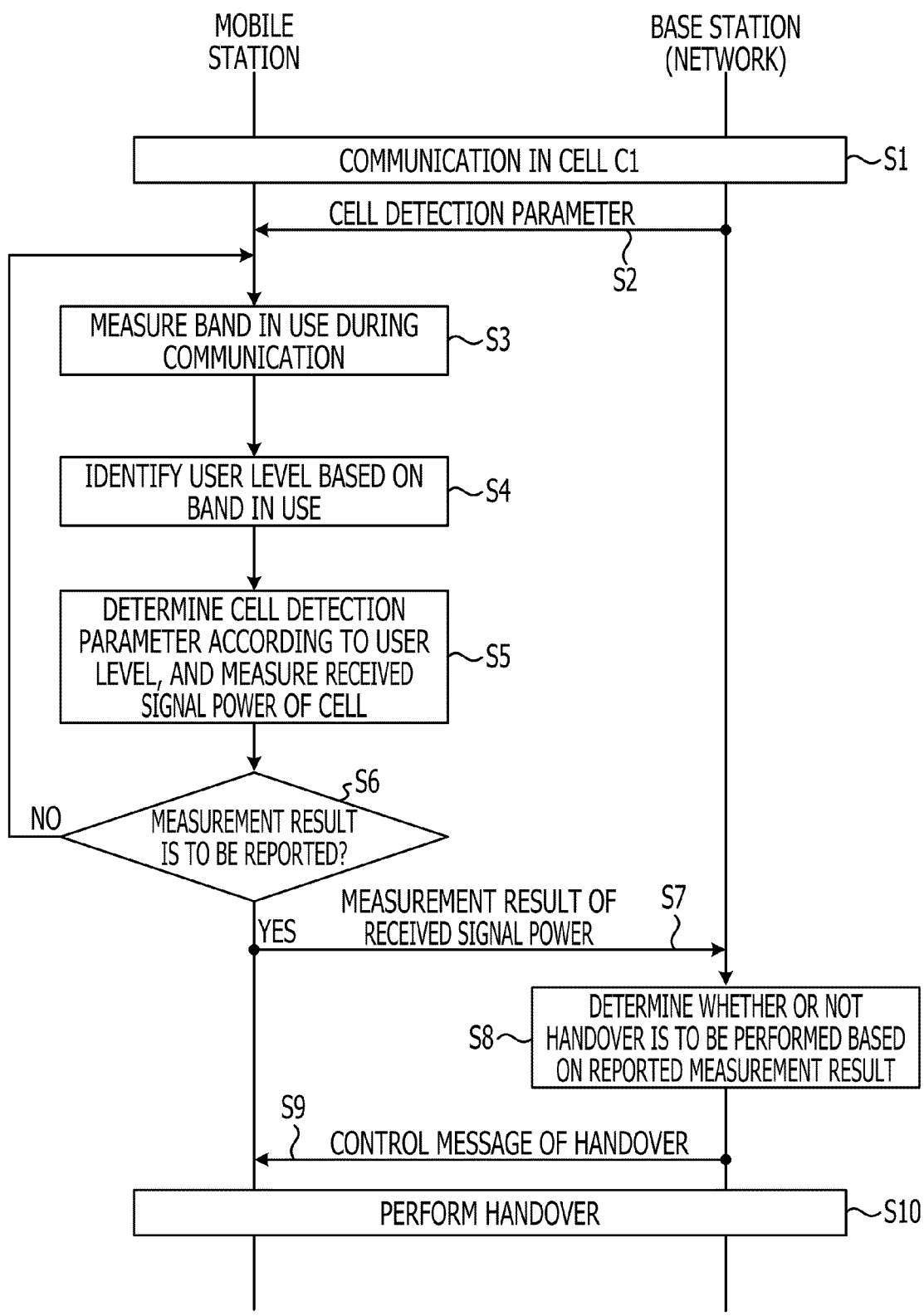
FIG. 6 is a sequence diagram for explaining the operation of a communication control system according to Embodiment 1.

FIG. 6 is a sequence diagram for explaining the operation of the communication control system 1 according to Embodiment 1. In S2, the communication unit 22 of the base station 20 transmits a measurement request signal to the mobile station 10 through an individual message, the measurement request signal requesting the measurement of the received signal power of cell C1 and the neighbor cell C2. The measurement request signal is managed by the parameter management unit 23, and includes a cell detection parameter (see FIGS. 2 and 3) associated with the band in use during communication and a user level.

In S3, the mobile station 10, when receiving the measurement request signal by the communication unit 11, measures the band in use of user data during current communication by the traffic amount measuring unit 12. In S4, the parameter determination unit 13 of the mobile station 10 refers to the cell detection parameter received in S2 to identify the user level of the mobile station 10 based on the band in use measured in S3. For example, when the band, which is used in the last one hour by the mobile station 10 currently in communication, is measured to be 6 Mbps in S3, the user level is identified as L3 because 6 Mbps corresponds to 5 to 10 Mbps (see FIG. 2).

In S5, the parameter determination unit 13 of the mobile station 10 determines a cell detection parameter according to the user level identified in S4, and then measures the received signal power of the serving cell C1 and the neighbor cell C2 based on the condition which is set in the cell detection parameter. Subsequently, when the mobile station 10 moves to the area of the neighbor cell C2 which overlaps with the serving cell C1, the control unit 16 determines whether or not the measurement results of received signal power is to be reported (S6). FIG. 7 is an illustration for explaining the manner in which a cell detection parameter is variably controlled when each mobile station is associated with cell C2. When it is determined in S6 that the measurement results are reported to the base station 20 (Yes in S6), the communication unit 11 of the mobile station 10 reports the measurement results of received signal power to the base station 20 as illustrated in FIG. 7 (S7). When it is determined in S6 that the measurement results are not reported to the base station 20 (No in S6), the sequence returns to the above-described S3, and the base station 10 repeats the processing in S3 and subsequent steps.

The control unit 21 of the base station 20 which has received the report of the measurement results determines whether or not handover of each mobile station is to be performed, based on the received signal power received signal power of the serving cell C1 and the neighbor cell C2 (S8), and sends the control message a mobile station for which handover is determined to be performed to perform handover (S9). Handover is then performed between the base station 20 and a mobile station to which the control message of handover is sent (S10). In the present embodiment, handover is performed on the mobile stations 30, 40 out of the mobile stations 10, 30, 40, 50 in FIGS. 5 and 7 as described above with reference to FIG. 2.

As for the mobile stations 10 and 50, the cell detection parameter is set such that measurement itself of the received signal power of cell C2 is not performed, and thus cell C2 is not detected and the measurement results are not reported to the base station 20. Thus, handover to cell C2 is not performed by the mobile stations 10 and 50. Particularly, the mobile station 10 continues communication with the base station 20 without performing handover to cell C2 even after moving into the area of cell C2. Upon detecting cell C3 in another wireless communication system, i.e., WLAN, the control unit 16 of the mobile station 10 switches the communication system from 3G to WLAN without reporting the measurement results to the base station 20 currently in communication.

Variable control of the cell detection parameter with the mobile stations associated with cell C1 has been described so far, and similar processing is performed as well when the mobile stations are associated with cell C2. That is to say, the mobile stations 10, 30, 40, and 50 discard the previous cell detection parameter 141 (see FIG. 2) in the parameter holding units 14, 34, 44, 54 upon handover to cell C2, and holds the cell detection parameter 142 (see FIG. 3) obtained from the handover destination base station 60. Each of the mobile stations 10, 30, 40, and 50 reports the measurement results to the base station 60 as appropriate according to the conditions which are set in the cell detection parameter 142 in the serving cell C2. After the report, each of the mobile stations 10, 30, 40, and 50 waits for a control message of handover, and upon receiving a control message from the base station 60, performs handover to a neighbor cell. Thus, the handover destination cell of each of the mobile stations 10, 30, 40, and 50 is variably controlled in a flexible and precise manner by the cell detection parameter so as to be adapted to the traffic state of cell. Consequently, the traffic of each cell may be efficiently distributed without increasing the network load of the cell.

As described above, the mobile station 10 according to the present embodiment has the traffic amount measuring unit 12, the parameter determination unit 13, the received signal power measuring unit 15, and the control unit 16. The traffic amount measuring unit 12 measures the amount of traffic in the serving cell C1. The parameter determination part 13 determines a condition (cell detection parameter) for handover to another cell C2, based on the amount of traffic measured by the traffic amount measuring unit 12. The received signal power measuring unit 15 measures the received signal power of the serving cell C1 and the another cell C2. When the received signal power measured by the received signal power measuring unit 15 satisfies the condition which is determined by the parameter determination unit 13, the control unit 16 controls transfer from the serving cell C1 to another cell C2.

Preferably, in the mobile station 10, the parameter determination unit 13 determines a condition for transferring to another cell (cell detection parameter), in which transfer of the mobile station 10 from the serving cell C1 to another cell C2 is more likely to occur as the amount of traffic measured by the traffic amount measuring unit 12 increases. That is to say, the parameter determination unit 13 preferably determines a condition for transferring to another cell C2, in which transfer of the mobile station 10 from the serving cell C1 to another cell C2 is less likely to occur as the amount of traffic decreases. Accordingly, a mobile station having a large amount of traffic is preferentially transferred to a cell other than cell C1. Consequently, the traffic in cell C1 is reduced.

It is preferable that the mobile station 10 further has the communication unit 11 which receives information from the base station 20 of the serving cell C1, the information indicating conditions (cell detection parameter) for transfer to another cell C2, and the parameter determination unit 13 determines a condition for transferring to another cell C2 using the information received by the communication unit 11. Thus, traffic control by the network using the information is made possible. Consequently, the communication control system 1 may quickly and easily respond to a change in the communication loads, arrangement, sizes, and communication states of the cells C1, C2.

As described above, the mobile station 10 according to Embodiment 1 autonomously changes a condition for determining handover to a neighbor cell according to the amount of real time traffic used by the mobile station 10, and reports the measurement results of received signal power of neighbor cells to the base station 20. In response to the report, the base station 20 may quickly transfer the cell for the mobile station 10 to another cell, and thus the traffic may be efficiently distributed while reducing the network load. That is to say, the mobile station 10 changes a parameter used in measuring a neighbor cell depending on the state of traffic in use in the current communication, and changes a condition for neighbor cell detection (condition for reporting the measurement results of received signal power) in the mobile station 10.

In other words, the mobile station 10 refers to the cell detection parameter previously acquired from the base station 20 (FIG. 2, FIG. 3), and variably determines a condition for cell detection processing by radio wave measurement according to the amount of traffic in the serving cell. The base station 20 on the network side determines whether or not handover is to be performed, based on a report from the mobile station 10 regarding the measurement results of received signal power, and it suffices for the base station 20 to send the control message to the mobile station 10 to perform handover as appropriate. Thus, the mobile station 10 may efficiently distribute the traffic without increasing the network load. Consequently, congestion due to concentration of the traffic on a specific cell (for example, cell C1) may be avoided.

With the communication control system 1 according to Embodiment 1, the serving cell may be precisely controlled based on the amount of traffic of the cell. For example, when the available traffic capacity of cell C2 is larger than that of cell C1, the communication control system 1 preferably transfers a mobile station having a large amount of traffic to cell C2 as much as possible from the viewpoint of efficient allocation of communication resources to the mobile stations. Based on a similar viewpoint, the communication control system 1 preferably transfers a mobile station having a small amount of traffic to cell C1 in a concentrated manner. Thus, when the mobile station 10 is associated with cell C1, the communication control system 1 provides a more relaxed condition of neighbor cell detection for performing handover as the amount of traffic in cell C1 increases, thereby promoting handover to cell C2. On the other hand, when the mobile station 10 is associated with cell C2, the communication control system 1 provides a more relaxed condition of neighbor cell detection for performing handover as the amount of traffic in cell C2 decreases, thereby promoting handover to cell C1. Thus, a mobile station having a small amount of traffic is likely to stay in cell C1 with a small capacity, and a mobile station having a large amount of traffic is likely to stay in cell C2 with a large capacity. Therefore, the traffic of the cells is distributed correspondingly to the available capacity of each cell. Consequently, cell management for mobile stations is achieved in consideration of efficiency of network management and user convenience.

[Embodiment 2]

Next, Embodiment 2 will be described. The configuration of a communication control system in Embodiment 2 is the same as the configuration of the communication control system 1 in Embodiment 1 illustrated in FIG. 1. Thus, common components are labeled with the same reference symbols, and the figures and detailed description are omitted. Embodiment 2 differs from Embodiment 1 in the communication state of each mobile station. Although transfer control over a mobile station during communication has been described in Embodiment 1, in Embodiment 2, transfer control over a mobile station on standby will be described. Hereinafter, the point of difference between Embodiments 1 and 2 regarding variable setting of a cell detection parameter depending on record of use (the amount of traffic in the past) on standby in cell C1 will be mainly described with reference to FIGS. 8 to 10.

FIG. 8 is a table illustrating an example of setting a cell detection parameter depending on record of use on standby in cell C1 according to Embodiment 2. Here, cell C1 is a serving cell before cell reselection of the mobile station 10. As illustrated in FIG. 8, "record of use on standby", which indicates the amount of traffic in the past, is set in a cell detection parameter 143 according to four user levels L1 to L4. In addition, a cell detection parameter is set for record of use on standby in such a manner that cell reselection from the current cell C1 to another cell C2 is more likely to occur as the amount of traffic increases.

Specifically, when the record of use on standby is "less than 1 Mbps", the cell detection parameter is set to "standby in cell C2 is prohibited", and thus the mobile station 10 does not perform cell reselection. When the record of use on standby is "1 Mbps or higher and lower than 5 Mbps", the mobile station 10 "performs cell reselection to cell C2 in the case where the received signal power of cell C2 exceeds a threshold value $T_{11}$ and the received signal power of cell C1 falls below a threshold value $T_{10}$." The threshold value $T_{11}$ is, for example, −100 dBm and the threshold value $T_{10}$ is, for example, −120 dBm. In this manner, when the record of use on standby is "1 Mbps or higher and lower than 5 Mbps", a condition is set as the cell detection parameter in which cell reselection is less likely to occur.

On the other hand, when the record of use on standby is "5 Mbps or higher and lower than 10 Mbps", the mobile station 10 "performs cell reselection to cell C2 in the case where the received signal power of cell C2 exceeds a threshold value $T_{12}$." The threshold value $T_{12}$ is, for example, −120 dBm. In this manner, when the band in use during communication is "5 Mbps or higher and lower than 10 Mbps", a condition is set as the cell detection parameter in which cell reselection is likely to occur. In addition, when the record of use on standby is "10 Mbps or higher", the mobile station 10 "measures the received signal power of cell C3 in another communication system, with sufficient remaining capacity and switches to the communication system in the case where the measured signal power exceeds a threshold value $T_{13}$." The threshold value $T_{13}$ is, for example, −120 dBm. In this manner, when the record of use on standby is "10 Mbps or higher", the mobile station 10 tries another wireless communication system (for example, WLAN) because the amount of traffic is significantly high.

The example of setting the cell detection parameter illustrated in FIG. 8 is preferable when the communication control system 1 intends to keep those users with a low use record as much as possible out of the users on standby in cell C1 and to set those users with a high use record on standby in cell C2 or in another communication system as much as possible. For example, such an example of setting is used when cell C1 has a large communication area and less available band capacity, and another cell (cell C2) with more available band capacity is present in the area of cell C1. Furthermore, for example, when cell C2 is overloaded due to a variation in network load or change of cell arrangement, the aforementioned example of setting may be changed as appropriate to make it difficult for cell reselection to cell C2 to occur (make it easy for users to stay in cell C1).

FIG. 9 is a table illustrating an example of setting a cell detection parameter depending on record of use on standby in cell C2 according to Embodiment 2. Here, cell C2 is a target cell after reselection of the mobile station 10. As illustrated in FIG. 9, the cell detection parameter 144 has a similar configuration to that of FIG. 8, however, in contrast to the cell detection parameter 143, a cell detection parameter is set for record of use on standby in such a manner that cell reselection from the current cell C2 to another cell C1 is less likely to occur as the amount of traffic increases.

Specifically, when the record of use on standby is "lower than 1 Mbps", the mobile station 10 "performs cell reselection to cell C1 in the case where the received signal power of cell C1 exceeds a threshold value $T_{14}$." The threshold value $T_{14}$ is, for example, −120 dBm. In this manner, when the record of use on standby is "lower than 1 Mbps", a condition is set as the cell detection parameter in which cell reselection is most likely to occur.

When the record of use on standby is "1 Mbps or higher and lower than 5 Mbps", the mobile station 10 "performs cell reselection to cell C1 in the case where the received signal power of cell C1 exceeds a threshold value $T_{15}$ and the received signal power of cell C2 falls below a threshold value $T_{16}$." In addition, when the record of use on standby is "5 Mbps or higher and lower than 10 Mbps", the mobile station 10 "performs cell reselection to cell C1 in the case where the received signal power of cell C1 exceeds a threshold value $T_{17}$ and the received signal power of cell C2 falls below a threshold value $T_{18}$." Although similar conditions are set to both of these cell detection parameters, a relationship between the threshold values may be defined that "the threshold value $T_{15}$<the threshold value $T_{17}$, and the threshold value $T_{16}$>the threshold value $T_{18}$" so that cell reselection to cell C1 is less likely to occur as the amount of record of use on standby increases. Specifically, the threshold value $T_{15}$ is, for example, −120 dBm and the threshold value $T_{17}$ is, for example, −110 dBm. The threshold value $T_{16}$ is, for example, −90 dBm and the threshold value $T_{18}$ is, for example, −100 dBm. In this manner, when the record of use on standby is "5 Mbps or higher and lower than 10 Mbps", a condition is set as the cell detection parameter in which cell reselection is less likely to occur than in the user level L2.

In addition, when the record of use on standby is "10 Mbps or higher", the mobile station 10 "measures the received signal power of cell C3 in another communication system, with sufficient remaining capacity and switches to the communication system in the case where the measured signal power exceeds a threshold value $T_{19}$." The threshold value $T_{19}$ is, for example, −120 dBm. In this manner, when the record of use on standby is "10 Mbps or higher", the mobile station 10 preferably tries another wireless communication system (for example, WLAN) because the amount of traffic is significantly high.

The example of setting the cell detection parameter illustrated in FIG. 9 is preferable when the communication control system 1 intends to keep those users with a high use record within cell C2 out of the users on standby in cell C2 as much as possible or to set those users with a high use record in another communication system, and to set those users with a low use record on standby in cell C1 as much as possible. Such an example of setting may be changed as appropriate to make it easy for cell reselection to cell C1 to occur (make it difficult for users to stay in cell C2), for example, when cell C2 is overloaded due to a variation in network load or change of cell arrangement.

FIG. 10 is a sequence diagram for explaining the operation of the communication control system 1 according to Embodiment 2. FIG. 10 includes similar processes to those in FIG. 6 which has been referred in the description of the operation according to Embodiment 1, and thus common steps are labeled with reference symbols with the same last numeral, and the figures and detailed description are omitted. Specifically, the processes in steps T1, T2, T4 to T6, and T10 in FIG. 10 correspond to those in steps S1, S2, S4 to S6, and S10 illustrated in FIG. 6, respectively.

First, in T0, the mobile station 10 holds the record of past data communication as "record of use on standby." The record of past data communication is, for example, a value obtained by converting an average of the communication record of yesterday to its equivalent in terms of bits per second (bps). However, the average may be either a moving average or a fixed average. The record of past data communication is not necessarily an average value over the last one day (24 hours), and may be an average value over the time period during which packet communication was actually performed. In addition, the record of past data communication is not necessarily an average value per day, and may be an average value over a specific time interval (for example, 1 to 6 p.m.) or an average value over multiple days (for example, one week).

In Embodiment 2, it is assumed that the mobile stations 10, 30, 40, and 50, in which the traffic bands of 1 Mbps or lower, 1 to 5 Mbps, 5 to 10 Mbps, and 10 Mbps or higher are respectively used, are on standby in cell C1 (T1). For each of the mobile stations 10, 30, 40, and 50, cell reselection to cell C2 may be performed with each mobile station associated with cell C1 because cell C2, which has a large capacity and a communication area narrower than cell C1, is arranged so as to be overlapped with cell C1.

In T2, the communication unit 22 of the base station 20 transmits a measurement request signal to the mobile station 10 through information for notice, the measurement request signal requesting the measurement of the received signal power of cell C1 and the neighbor cell C2. The measurement request signal is managed by the parameter management unit 23, and includes a cell detection parameter (see FIGS. 8 and 9) associated with the band in use during communication and a user level. The information for notice is multicast or broadcast from the base station 20.

In T4, the parameter determination unit 13 of the mobile station 10 refers to the cell detection parameter received in T2 to identify the user level of the mobile station 10 based on the record of use held in T10. For example, when "3 Mbps" is held as an average value of the band which is used in the last one day by the mobile station 10 on standby in T0, the user level is identified as L2 because 3 Mbps corresponds to 1 to 5 Mbps (see FIG. 8).

In T5, the parameter determination unit 13 of the mobile station 10 determines a cell detection parameter according to the user level identified in T4, and then measures the received signal power of the serving cell C1 and the neighbor cell C2 based on the condition which is set in the cell detection parameter. Subsequently, when the mobile station 10 moves to the area of the neighbor cell C2 which overlaps with the serving cell C1, the control unit 16 determines whether or not cell reselection is to be performed (T6). Whether or not cell reselection is to be performed is determined according to a corresponding condition which is set in the cell detection parameter. Referring back to FIG. 8, for example, the case where the user level of a mobile station on standby is "L2" or "L3" corresponds to the case where cell reselection is to be performed (Yes in T6). Thus, when the condition for cell detection parameter is satisfied, the control unit 16 of the mobile station 10 performs cell reselection for the base station 20 (T10). When it is determined that cell reselection is not to be performed in T6 (No in T6), the sequence returns to the aforementioned T4 and the base station 10 repeats the processing in T4 and subsequent steps.

Figure 7:
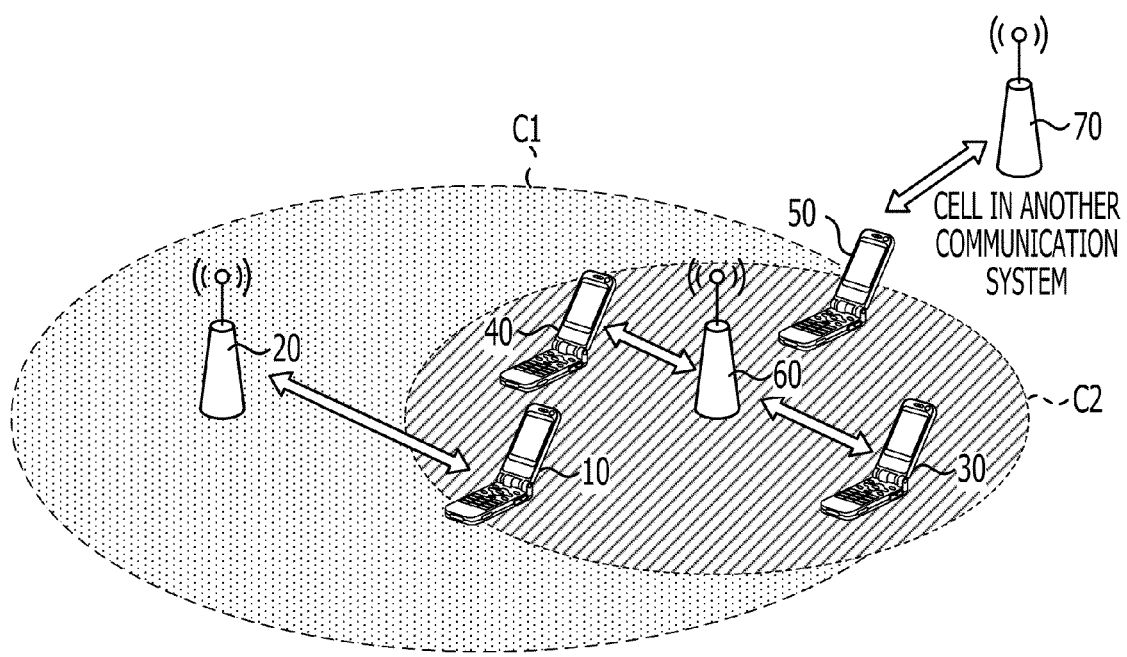
FIG. 7 is an illustration for explaining the manner in which a cell detection parameter is variably controlled when each mobile station is associated with cell C2.

In the present embodiment, cell reselection is performed on the mobile stations 30, 40 out of the mobile stations 10, 30, 40, 50 in FIGS. 5 and 7 as described above with reference to FIG. 8. As for the mobile stations 10 and 50, the cell detection parameter is set such that measurement itself of the received signal power of cell C2 is not performed, and thus cell C2 is not detected and the measurement results are not reported to the base station 20. Thus, cell reselection to cell C2 is not performed by the mobile stations 10 and 50. Particularly, the mobile station 10 continues communication with the base station 20 without performing cell reselection to cell C2 even after moving into the area of cell C2. Upon detecting cell C3 in another wireless communication system, i.e., WLAN, the control unit 16 of the mobile station 10 switches the communication system from 3G to WLAN irrespective of the received signal power of the cells C1, C2.

Variable control of the cell detection parameter with the mobile stations associated with cell C1 has been described so far, and similar processing is performed as well when the mobile stations are associated with cell C2. That is to say, the mobile stations 10, 30, 40, and 50 discard the previous cell detection parameter 143 (see FIG. 8) in the parameter holding units 14, 34, 44, 54 upon cell reselection to cell C2, and holds the cell detection parameter 144 (see FIG. 9) obtained from the cell reselection destination base station 60. Each of the mobile stations 10, 30, 40, and 50 performs cell reselection for the base station 60 as appropriate according to the conditions which are set in the cell detection parameter 144 in the serving cell C2. Thus, the cell reselection destination cell of each of the mobile stations 10, 30, 40, and 50 is variably controlled in a flexible and precise manner by the cell detection parameter so as to be adapted to the traffic state of cell. Consequently, the traffic of each cell may be efficiently distributed without increasing the network load of the cell.

As described above, the mobile station 10 according to Embodiment 2 allows transfer to be controlled according to the traffic record of use by users. For example, the mobile station 10 having low frequency in use and a long standby time may control transfer by performing handover or cell reselection to a cell which has a low communication rate and a long continuous standby time and uses another communication system. That is to say, in Embodiment 2, the mobile station 10 determines a user level not based on the current traffic use state measured by itself, but based on the traffic use state (record of use) in the past, and changes the cell detection parameter according to the level. Consequently, the mobile station 10 may change the parameters of not only handover during data communication (in connection) but also cell reselection performed in standby time during which no data communication is performed.

Particularly, in a cell reselection operation, unlike a handover operation, the mobile station 10 may autonomously transfer to another cell without waiting for a control message from the network. For this reason, a better effect is obtained with respect to reducing processing load of the network.

In the above-described Embodiment 1, the mobile station 10 selects a cell detection parameter to be applied by using the band in use during communication which indicates the current amount of traffic. However, without being limited to the above configuration, the mobile station 10 may select a cell detection parameter using the communication record which indicates the amount of traffic in the past (for example, the number of packets transmitted and received in one day of yesterday) even in Embodiment 1. In addition, the mobile station 10 may selectively use a greater or less amount of traffic out of the amounts of traffic at the present and in the past for determining a cell detection parameter. Moreover, the mobile station 10 may use a combination of two types of traffic amounts, for example, by averaging or adding the amounts of traffic at the present and in the past. In this case, one of the amounts of traffic may be weighted. Thus, the mobile station 10 may achieve precise selection of a cell detection parameter and ultimately highly accurate transfer control between cells based on the traffic amount which precisely corresponds to the communication state of the mobile station 10.

In the above-described embodiments, the threshold values $T_1$ to $T_{19}$ for received signal power which are set in the cell detection parameter are −120 dBm, −110 dBm, and −100 dBm, −90 dBm by way of example. However, the threshold values are not limited to −120 dBm and −110 dBm, and may be a value of received signal power for which a wireless communication channel is detectable by a mobile station between the base station and the mobile station. In addition, the threshold values are not limited to −100 dBm and −90 dBm, and may be a value of received signal power for which a wireless communication channel is detectable by a mobile station between the base station and the mobile station.

In Embodiment 1, the mobile station 10 determines whether or not handover is to be performed and a handover destination cell based on the current communication state. In Embodiment 2, the mobile station 10 determines whether or not cell reselection is to be performed and a cell reselection destination cell based on the communication record in the past. However, without being limited to the above configuration, the mobile station 10 may predict a future amount of traffic based on the communication state at the present and in the past, and may variably determine whether or not cell transfer is to be performed and a transfer destination cell according to the future amount of traffic. In such a configuration, transfer (handover, cell reselection) to cell C1 with a small capacity is not performed on a mobile station for which the amount of traffic at the present is relatively small but a large amount of traffic flow is expected to occur after several tens of minutes. Thus, returning of the mobile station 10, which has once transferred to another cell, to the previously serving cell in a short time (back and force transfer between cells) is avoided. Consequently, the load of the communication control system 1 is reduced. For example, control of transferring to cell C2 with a large capacity is performed before an increase in the amount of traffic on a mobile station for which the amount of traffic at the present is relatively small but a large amount of traffic flow is expected to occur after several seconds to several minutes. In this manner, shortage of wireless resources in cell C1 with a small capacity due to sudden increase in traffic is reliably avoided. Consequently, the reliability of the communication control system 1 is improved.

In the above-described embodiments, the mobile station 10 obtains a cell detection parameter through an individual message or information for notice which is transmitted from the base station 20. However, the mobile station 10 may previously store cell detection parameters in the parameter holding unit 14 before entering the cell of the base station 20. In the description of the embodiments, the mobile station 10 is assumed to be a wireless communication terminal such as a cellular phone, a smart phone, or a Personal Digital Assistant (PDA). The present disclosure, however, may be applied to not only mobile stations, but also various communication devices which are capable of performing handover or cell reselection.

In addition, each component of the mobile station 10 illustrated in FIG. 1 is not necessarily physically configured as illustrated in the drawings. That is to say, the specific configuration of division/integration of the devices is not limited to those illustrated in the drawings, and all or a part of the devices may be functionally or physically divided/integrated in any unit according to various types of loads and application situations. For example, the traffic amount measuring unit 12 and the received signal power measuring unit 15, or the parameter determination unit 13 and the control unit 16 may be integrated into a single component. Alternatively, the traffic amount measuring unit 12 may be divided into two units: one unit is for measuring the amount of traffic in the present communication, and the other unit is for measuring the amount of traffic in the past communication (communication record). Optionally, the control unit 16 may be divided into two units: one unit in which the mobile station 10 performs handover, and the other unit in which the mobile station 10 performs cell reselection. The memory 10b may be connected via a network or a cable as an external device of the mobile station 10.

According to the above-described embodiments, the effect is obtained that the traffic in cells may be efficiently distributed while reducing the network load.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal comprising
a processor coupled to a memory, configured to:
    measure an amount of traffic in a serving cell formed by a base station configured to perform a wireless communication with the mobile terminal,
    determine a condition for transferring to another cell based on the measured amount of traffic,
    measure a received signal power of the serving cell and the another cell, and
    control transfer from the serving cell to the another cell when the measured received signal power satisfies the determined condition.

2. The mobile terminal according to claim 1,
wherein the processor is configured to determine the condition in such a way that transferring the mobile terminal from the serving cell to the another cell is more likely to occur as the measured amount of traffic increases.

3. The mobile terminal according to claim 1, further comprising:
    a receiver configured to receive, from a base station of the serving cell, information which indicates conditions for transferring to the another cell,
    wherein the processor is further configured to determine the condition using the information.

4. The mobile terminal according to claim 1, wherein determining a condition for transferring to another cell based is further based on a band in use.

5. The mobile terminal according to claim 1, wherein control transfer from the serving cell to the another cell is initiated by a control message transmitted by the base station based on reporting measurement results to the base station.

6. The mobile terminal according to claim 1, wherein the processor coupled to the memory is further configured to include:
    a traffic measuring unit configured to measure an amount of traffic in a serving cell,
    a parameter determination unit configured to determine a condition for transferring to another cell based on the measured amount of traffic and a band in use,
    a received signal power measuring unit configured to measure a received signal power of the serving cell and the another cell, and
    a control unit configured to control transfer from the serving cell to the another cell when the measured received signal power satisfies the determined condition.

7. The mobile terminal according to claim 6, wherein the parameter determination unit is further configured to determine a cell detection parameter based on conditions for transferring to another cell based on the measured amount of traffic and a band in use and wherein the control unit is further configured to control transfer from the serving cell to the another cell when the measured received signal power satisfies the determined cell detection parameter.

8. A communication control method comprising:
    measuring, by a mobile terminal being configured to perform a wireless communication with a base station, an amount of traffic in a serving cell formed by the base station;
    determining, by the mobile terminal, a condition for transferring to another cell based on the measured amount of traffic;
    measuring, by the mobile terminal, a received signal power of the serving cell and the another cell; and
    controlling, by the mobile terminal, transfer from the serving cell to the another cell when the measured received signal power satisfies the determined condition.

9. The communication control method according to claim 8,
wherein the determining includes determining the condition in such a way that transferring the mobile terminal from the serving cell to the another cell is more likely to occur as the measured amount of traffic increases.

10. The communication control method according to claim 8, further comprising
    receiving information which indicates conditions for transferring to the another cell from a base station of the serving cell,
    wherein the determining includes determining the condition using the information.

11. A communication control system comprising:
    a mobile terminal; and
    a base station configured to form a serving cell of the mobile terminal and perform a wireless communication with the mobile terminal,
    wherein the mobile terminal is configured to:
    measure an amount of traffic in the serving cell,
    determine a condition for transferring to another cell based on the measured amount of traffic,
    measure a received signal power of the serving cell and the another cell, and
    control transfer from the serving cell to the another cell when the measured received signal power satisfies the determined condition.

12. The communication control system according to claim 11,
  wherein the condition is determined in such a way that transfer of the mobile terminal from the serving cell to the another cell is more likely to occur as the measured amount of traffic increases.

13. The communication control system according to claim 11,
  wherein the base station is configured to transmit to the mobile terminal information which indicates conditions for transferring to the another cell, and
  the mobile terminal is configured to receive the information, from the base station, which indicates conditions for transferring to the another cell and determine the condition for transferring to the another cell using the information.

* * * * *